United States Patent
Weickel et al.

[19]

[11] Patent Number: 6,055,953
[45] Date of Patent: *May 2, 2000

[54] GAS ENGINE HAVING ROLLER-SHAPED ROTARY SLIDE VALVE

[75] Inventors: Hans Weickel; Karl Stellwagen, both of Mannheim; Heinz Willms, Weinheim, all of Germany

[73] Assignee: MWM AG, Mannheim, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/912,348

[22] Filed: Aug. 18, 1997

[30] Foreign Application Priority Data

Aug. 24, 1996 [DE] Germany .................... 196 34 299

[51] Int. Cl.⁷ .................................................... F02D 9/16
[52] U.S. Cl. ........................ 123/190.1; 123/336; 123/337
[58] Field of Search ................ 123/190.1, 79 A, 123/80 R, 80 BA, 80 BB, 190.3, 336, 337, 184.21, 306, 308

[56] References Cited

U.S. PATENT DOCUMENTS

| | | | |
|---|---|---|---|
| 1,118,975 | 12/1914 | Van Vleck | 123/80 BA |
| 4,517,938 | 5/1985 | Krüger | 123/190.17 |
| 4,864,985 | 9/1989 | Slee | 123/190.5 |
| 4,890,582 | 1/1990 | Schatz et al. | 123/26 |
| 4,892,071 | 1/1990 | Asayama | 123/336 |
| 4,909,211 | 3/1990 | Cook et al. | 123/337 |
| 4,920,934 | 5/1990 | Pizzicara | 123/80 BA |
| 4,993,369 | 2/1991 | Breckenfeld et al. | 123/184.23 |
| 5,105,784 | 4/1992 | Davis et al. | 123/337 |
| 5,255,657 | 10/1993 | Stellwagen | 123/527 |
| 5,474,040 | 12/1995 | Corona | 123/478 |
| 5,477,823 | 12/1995 | Uchida | 123/308 |
| 5,572,967 | 11/1996 | Donaldson, Jr. | 123/190.12 |
| 5,579,730 | 12/1996 | Trotter | 123/80 BA |
| 5,749,335 | 5/1998 | Flanery, Jr. et al. | 123/337 |
| 5,819,706 | 10/1998 | Tsuchida et al. | 123/432 |

FOREIGN PATENT DOCUMENTS

| | | | |
|---|---|---|---|
| 0241925 | 9/1990 | Japan | 123/190.1 |
| 404166624 | 6/1992 | Japan | 123/190.1 |

*Primary Examiner*—Noah P. Kamen
*Assistant Examiner*—Hai Huynh
*Attorney, Agent, or Firm*—Nexsen Pruet Jacobs & Pollard, LLP; Charles L. Schwab, Esq.

[57] ABSTRACT

The governor for a gasoline engine is a roller-shaped rotary slide valve (8a, 8b) which permits precise adjustment of the quantity of gas-air mixture supplied to the combustion chamber. The actuation forces for operating the rotary slide valve (8a, 8b) are lower than previously used throttle valves, which permits use of a smaller and less expensive control device for operating the valve.

3 Claims, 1 Drawing Sheet

GAS ENGINE HAVING ROLLER-SHAPED ROTARY SLIDE VALVE

TECHNICAL FIELD

This invention relates to a gasoline engine, in particular a four-cycle gasoline engine, having a crankcase, at least one cylinder/cylinder-head unit with a combustion chamber, to which an air-gas mixture is delivered by a mixer or carburetor, and a governor for adjusting the quantity of the air-gas mixture supplied to the combustion chamber.

BACKGROUND OF THE INVENTION

The gasoline engine shown and described in patent document EP-B 0 465 944 is concerned with holding the pollutant emission low even with fluctuating gasoline quality and fluctuating intake air temperature. This is achieved through a system which gauges the power of the gasoline engine by monitoring a throttle valve in the gas-air mixture line and determining the temperature in the combustion chamber based on the average of the average temperatures determined in all combustion chambers.

OBJECTS AND SUMMARY OF THE INVENTION

It is an object of the invention to provide a gas-air quantity governor which is accurate, requires less torque to adjust to different positions, is easy to manufacture and gives long trouble free service.

It is a further object of this invention to provide a quantity governor in the form of a rotary slide valve by which the quantity of gas-air mixture supplied to the combustion chamber is very accurately adjusted.

A rather exact adjustment is already achievable even with known throttle-valve governors, which adjustment can, however, be further improved by this invention. This invention provides favorable exhaust emission values, low fuel consumption, and good control behavior under load. The actuation forces for operating the rotary slide valve are lower than with a corresponding throttle valve. This has the advantage that the corresponding control device can be sized correspondingly smaller, with attendant savings in cost and space requirements.

In the prior art throttle vale, for reasons having to do with control, the maximum valve setting is at most approximately 60° to the tube axis. Thus only about one half of the flow capacity through the throttle valve is usable. A pressure loss results even with the throttle valve maximally opened, which pressure loss must be taken into consideration with a "tube symmetry factor" in the design of the system. In order to guarantee the required throughput, it has therefore been necessary to design the throttle valve correspondingly large in diameter relative to the tube diameter or, depending on requirements, to place two or more throttle valves in parallel. Even if the corresponding quantitative flow rates can be conveyed through the throttle valves by such an arrangement, the pressure drop still present at the throttle valve results in an increase in the torque to actuate the throttle valve.

In the designing of the rotary slide valve according to this the invention, a maximum rotation angle of approximately 60° is also used. However, by using a rotary slide valve, it is possible to position the hole passing through the rotary slide valve in such a way that, at an angular position of approximately 60°, this hole has a size that corresponds to the full diameter of the arriving and departing flow cross sections upstream and downstream of the rotary slide valve. In order to achieve the same throughput through the rotary slide valve as through a throttle valve with equal rotational angles, the rotary slide valve can be made correspondingly smaller. Also, the actuation forces for positioning the rotary slide valve are smaller. A smaller and less costly control device can therefore be used.

The rotary slide valve is a roller shaped rotary slide valve. Among the various options for the design of the rotary slide valve, is a ball-type rotary slide valve. The use of a roller-shaped slide valve has proven to be especially suitable.

A preferred embodiment of the invention uses a plurality of, in particular three, holes or passageways lying one over the other in the cylindrical body of the roller-shaped rotary slide valve. By this design the required flow cross section can be split in a simple fashion, and the diameter of the roller-shaped rotary slide valve can be made smaller.

The flow passageways in the cylindrical body are preferably annular but may be oval in section. Design or optimization of the rotary slide valve according to individual engine criteria is possible and easy when using this invention.

In carrying out the invention, the roller-shaped rotary slide valve may have a tubular shaped flow control element. The wall thickness of the cylindrical body, or tube, at least in the regions surrounding the hole, is easily optimizable in accordance with laws having to do with strength of materials and flow resistance. This optimization, initially done from the standpoint of flow resistance, is accompanied by verification as to whether the optimization is adequate from the standpoint of strength of materials.

A very favorable price-to-performance ratio is realizable with a roller-type rotary slide valve manufactured from a cast material. In short production runs, low-cost production is possible because casting molds are not needed to produce the steel tubes. If the roller-shaped rotary slide valve is manufactured from a steel tube, the roller-shaped rotary slide valve can be manufactured with thinner wall thicknesses, which is advantageous with regard to flow resistance, as previously stated.

BRIEF DESCRIPTION OF THE DRAWINGS

Further advantages of the invention can be inferred from the description of the drawings, in which:

FIG. 1a shows a console or manifold for attachment to an internal combustion engine and FIG. 1b is an exploded view of two roller-shaped rotary slide valves which are insertable into the console of FIG. 1a.

DETAILED DESCRIPTION OF THE INVENTION

Figure 1B:
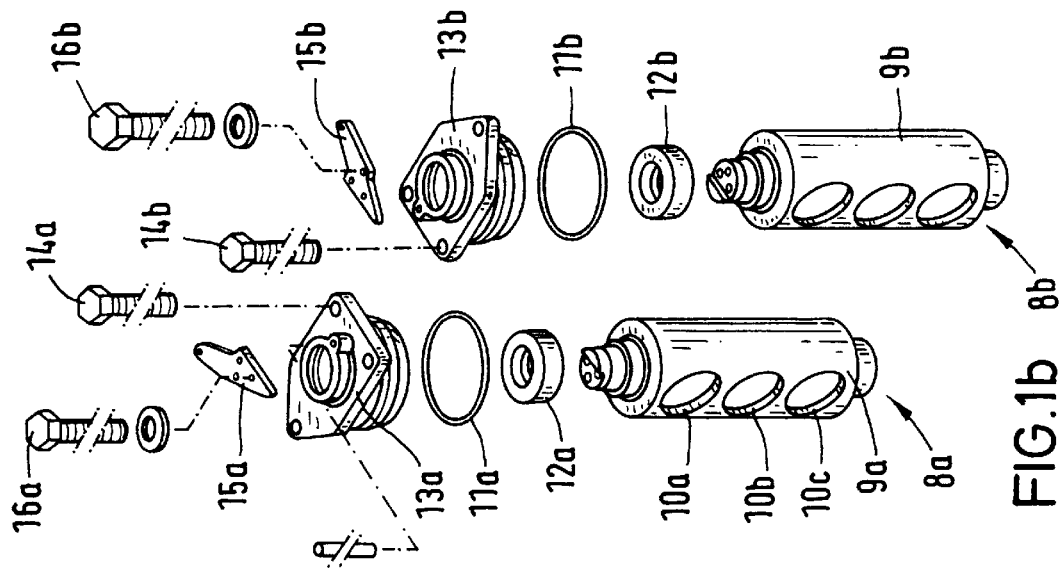

The console or manifold shown in FIG. 1 is attached, via end face 2, to the end of an internal combustion engine opposite to the flywheel. For this purpose, a peripheral flange 3 having mounting holes is provided on the end face 2, through which mounting holes corresponding mounting screws can be passed.

The two side walls 4a, 4b of the manifold 1 have mounting frames 5a, 5b, to which the charge cooler or, respectively, the mixture cooler can be secured. Supplied to this charge cooler or, respectively, the mixture cooler is combustion air compressed by at least one exhaust gas turbocharger, which then is conveyed into the console 1 via ducts 6a, 6b that issue from the side walls 4a, 4b. The ducts 6a, 6b divert the mixture (gasoline-air) in the direction toward the end face 2, the ducts 6a, 6b being intersected in the region of end face 2 by two parallel cylindrical holes 7a, 7b lying one next to the other. The ducts 6a, 6b then open at end face 2 and from there make transitions to corresponding charge or, respectively, mixture lines of the internal combustion engine. These charge or, respectively, mixture lines are connected to the combustion chambers of the individual cylinders of the internal combustion engine via intake valves.

Figure 1A:
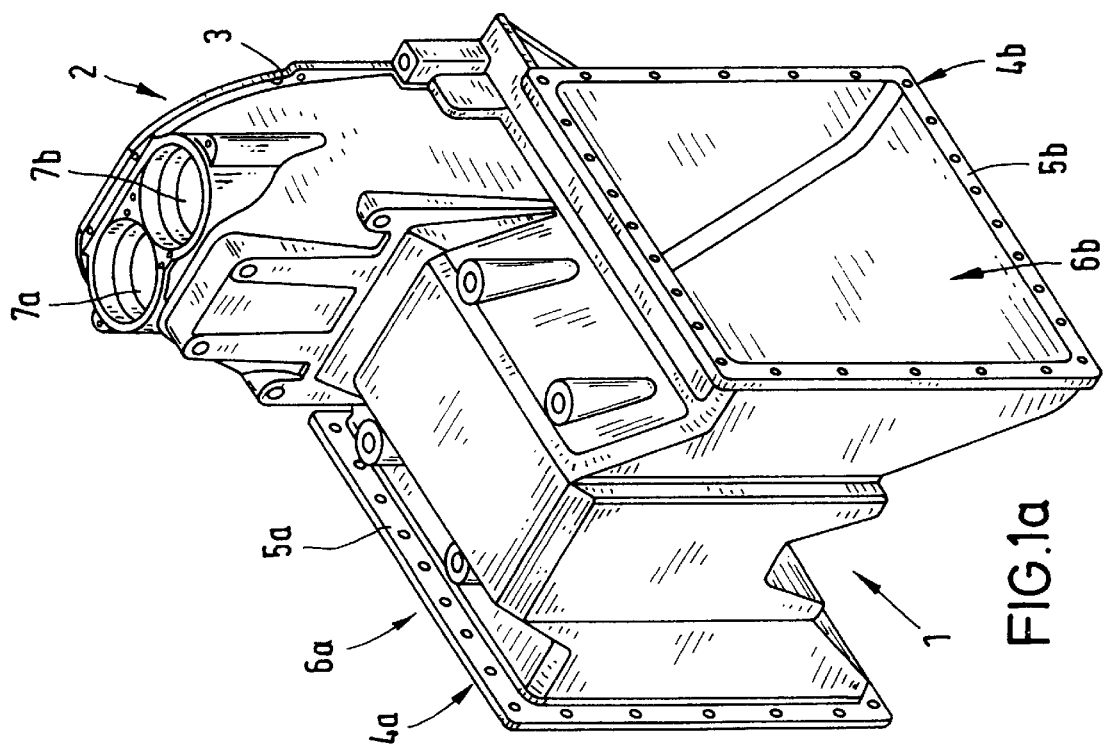

The roller-shaped rotary slide valves 8a, 8b illustrated in FIG. 1a are insertable into the cylindrical holes 7a, 7b of the manifold 1. Each of these roller-shaped rotary slide valves 8a, 8b has a cylindrical body 9a, 9b, which is closed at opposite ends by circular covers in a welded construction, cylindrical bearing stubs being attached to each of the covers for support and for the attachment of actuating means. Three circular holes or passageways 10a, 10b, 10c lying one above another are made in each of the cylindrical bodies 9a, 9b, which holes pass all the way through the cylindrical bodies 9a, 9b and are spaced from one another in the direction of the axis of the cylindrical bodies 9a, 9b. In the case of hollow roller-type rotary slide valves 9a, 9b, the holes 10a, 10b, 10c on diametrically opposite sides of the bodies 9a, 9b are connected to one another by means of tubular inserts extending therebetween. Flow losses are reduced by this construction.

The roller-shaped rotary slide valves 8a, 8b are inserted from above into the cylindrical holes 7a, 7b and engage their lower cylindrical bearing stubs in complementary bearings in the manifold. Lip seals 11a, 11b are first slid onto the upper cylindrical bearing stubs, and afterward O-rings 12a, 12b are placed on the studs. Covers 13a, 13b are then placed on the openings 7a, 7b and fastened to the manifold 1, each with a plurality of screws 14a, 14b. These covers 13a, 13b have a hole through which the upper cylindrical bearing stubs extend. Levers 15a, 15b are mounted on the bearing stubs with mounting screws 16a, 16b. A common control device, or a separate control device, for each roller-type rotary slide valve can be articulated, or pivotally connected, to these levers 15a, 15b, via corresponding actuating arms if appropriate. The control device having the corresponding lever mechanism is then designed in such a way that the roller-shaped rotary slide valves 8a, 8b can be rotated at least approximately 60°. This rotary motion makes it possible to adjust the holes 10a, 10b, 10c from a position completely closing the ducts 6a, 6b to a completely opening position. In the interior of the console 1, the ducts 6a, 6b can further be made in such a way that they are split into sub-ducts exactly registering with the holes 10a, 10b, 10c, which sub-ducts then, at the end face 2 of the console, recombine to become two ducts 6a, 6b or combine into a single duct.

In the exemplary embodiment illustrated, as has previously been described, the charge air cooler or, respectively, mixture cooler, is arranged upstream of the roller-shaped rotary slide valves 8a, 8b in the flow direction of the charge air or, respectively, mixture. In the framework of the invention, however, it is equally possible to arrange the charge air cooler or, respectively, mixture cooler downstream of the roller-type rotary slide valves 8a, 8b in the flow direction. Furthermore, the invention is not restricted to the use of two roller-shaped valves each having three holes 10a, 10b, 10c. A single roller-shaped rotary slide valve or more than two roller-shaped rotary slide valves having one or a plurality of holes 10a, 10b, 10c can also be used.

What is claimed is:

1. In a gas engine having a crankcase, at least two cylinder/cylinder-head units, each having a combustion chamber, and a flywheel at one end of the engine, the combination comprising:

a manifold on the end of said engine opposite said one end, including first and second ducts for delivering an air-gas mixture to said combustion chambers, respectively, said ducts extending, respectively, from said laterally opposite sides of said manifold to a side of said manifold adapted for connection to said cylinder/cylinder-head units, first and second parallel vertical holes in said manifold intersecting said first and second ducts, respectively, adjacent said side of said manifold adapted for connection to said cylinder/cylinder-head units and a roller shaped rotary slide valve in each of said ducts including a tubular flow control element rotatably mounted in each of said first and second vertical holes in intersecting relation to said ducts, respectively, each of said flow control elements including a plurality of passageways therethrough transverse to the vertical axis of rotation of said flow control element through which said air-gas mixture flows to the associated one of said combustion chambers, said flow control elements being operable upon rotation to govern the quantity of air-gas mixture delivered, respectively, to said combustion chambers, whereby engine speed is controlled; said passageways in each of said flow control elements being parallel to one another and spaced vertically from one another in the direction of said axis of rotation of the associated flow control element.

2. The gas engine of claim 1 wherein each of said flow control elements includes 3 passageways.

3. The gas engine of claim 1, wherein said flow control element is tubular and said passageways are formed by tubular inserts installed in aligned openings in diametrically opposite sides of said tubular flow control element.

* * * * *